No. 836,820. PATENTED NOV. 27, 1906.
L. H. NASH.
METER REGISTER.
APPLICATION FILED AUG. 6, 1904.

2 SHEETS—SHEET 1.

No. 836,820. PATENTED NOV. 27, 1906.
L. H. NASH.
METER REGISTER.
APPLICATION FILED AUG. 6, 1904.

2 SHEETS—SHEET 2.

UNITED STATES PATENT OFFICE.

LEWIS HALLOCK NASH, OF SOUTH NORWALK, CONNECTICUT, ASSIGNOR TO NATIONAL METER COMPANY, OF NEW YORK, N. Y., A CORPORATION OF NEW YORK.

METER-REGISTER.

No. 836,820.     Specification of Letters Patent.     Patented Nov. 27, 1906.

Application filed August 6, 1904. Serial No. 219,700.

*To all whom it may concern:*

Be it known that I, LEWIS HALLOCK NASH, a citizen of the United States, and a resident of South Norwalk, in the county of Fairfield and State of Connecticut, have invented a new and useful Improvement in Meter-Registers, of which the following is a full, clear, and exact description.

My invention relates to an improvement in the manner of incasing the mechanism constituting the registering portion of the meter.

In the accompanying drawings I have shown my invention embodied in the form at present preferred by me; but it will be understood that various modifications and changes may be made without departing from the spirit of my invention and without exceeding the scope of my claims. The following is a description of the said drawings, in which similar characters of reference indicate corresponding parts in all the figures.

Figure 1:
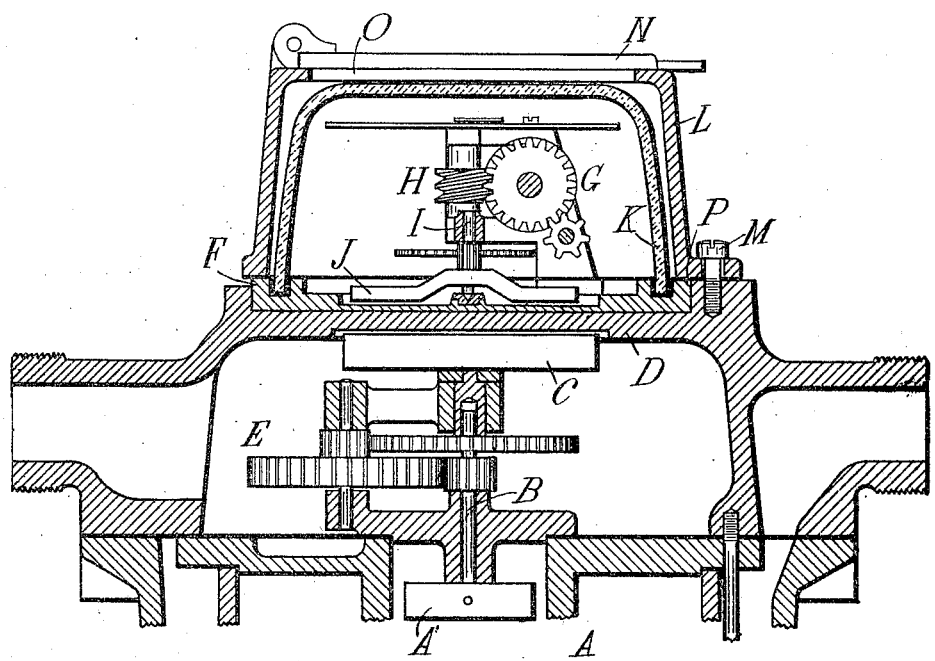
Figure 2:
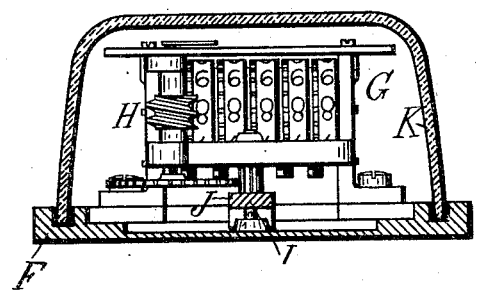
Figure 3:
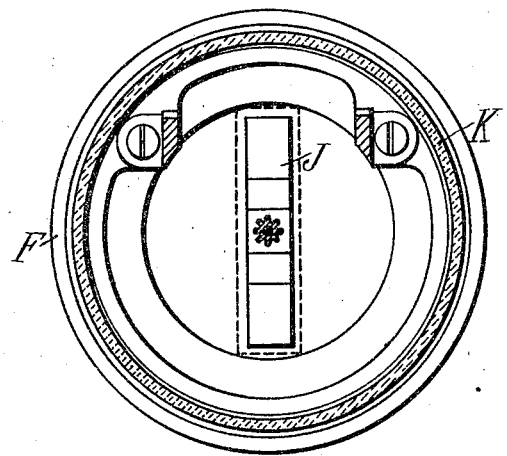

Figure 1 is a sectional elevation of a structure involving my improvement. Fig. 2 is a section taken at right angles to Fig. 1, but with the meter portion removed. Fig. 3 is a sectional plan.

A is the upper casing of the measuring-chamber of a water-meter.

A' is a projection on the shaft B, against which the spindle of the piston of the meter impinges.

E is a train of speed-reducing gears, and C is a permanent magnet revolved by said gears.

D is the upper casing supporting the register-mechanism case. The case of the register mechanism is composed of a base F and a dome K, of glass, hermetically sealed to said base.

G is the register, which I have shown as of the straight-reading type. This register is driven by the shaft I, upon the lower end of which is fixed the permanent magnet J within the field of the magnet C.

L is a protective cover attached to the meter-case by means of the screw M and provided with the opening O and the cover N. It forms a shoulder P over the base-plate of the chamber containing the register mechanism and holds it in place.

As far as I am aware, the case inclosing the register mechanism of a water-meter has always been rigidly fastened to the meter-case. In the structure described, however, the case of the register mechanism is independent of the case and is not rigidly or directly fastened thereto. After the meter is connected with the main the case of the register mechanism may therefore be turned through any desired angle to facilitate readings. The axis of rotation should always coincide with that of the members J and C. I have attained this result in the particular type shown by making the base-plate F circular, resting in a circular depression in the head D. This result might be attained in various ways obvious to those skilled in the art.

My improvement is in no way limited to the particular device shown nor to that general class in which motion is transmitted by means of a magnetic field, for it might be applied with the same good results even in the meters in which a shaft extends from the measuring-chamber up into the registering-chamber.

Therefore what I claim, and desire to secure by Letters Patent, is—

1. In a water-meter, the combination with the case thereof, of a chamber containing the register mechanism being a complete closure independent of the meter-case combined with a case inclosing said chamber and securing the same in place.

2. In a water-meter, the combination with the case thereof, of a hermetically-sealed chamber containing the register mechanism, said chamber being a closure independent of the meter-case and capable of movement with respect thereto when the parts are assembled.

3. The combination with a meter of a registering mechanism, and a hermetically-sealed case for containing said mechanism, said case and mechanism being free to be turned to any desired angle relative to one another.

4. The combination with a meter of a registering mechanism, a hermetically-sealed case for said mechanism, said case and mechanism being free to be turned to any angle relative to one another, and means controlled by the meter for magnetically actuating the registering mechanism.

5. The combination with a meter, of a registering mechanism, a hermetically-sealed case for containing said mechanism, both the case and mechanism being free to be turned to any angle relative to one another, a magnet connected with and revolved by the meter-shaft and within the meter-chamber and a second magnet within said sealed case, inductively moved by said first magnet to operate the registering mechanism.

6. The combination with a meter, of a registering mechanism, and a plurality of nested casings enveloping said registering mechanism, one of said casings being hermetically sealed and movable relative to the meter-casing.

7. In a meter the combination with the case thereof, of registering mechanism mounted upon said case, and a plurality of nested casings enveloping and covering the registering mechanism, one of said casings being hermetically sealed and rotatable relative to the meter-case.

8. In a water-meter the combination with the case thereof having a depression formed in its body portion, of a plate mounted to turn in said depression, registering mechanism mounted on said plate, an outer and an inner casing enveloping said registering mechanism, said inner casing being hermetically sealed to the base-plate.

9. In a water-meter the combination of a hermetically-sealed closure containing a registering mechanism, a magnet within said closure connected to the registering mechanism, a meter-case, a magnet within the meter-case adapted to operate the magnet of the register.

10. In a water-meter the combination of a chamber, a complete registering mechanism arranged within said chamber, a magnet within said chamber, and connected to the registering mechanism, a meter-case independent of the registering-mechanism chamber and a magnet in the meter-case coöperating with the magnet of the register.

In testimony whereof I have hereunto signed my name in the presence of two subscribing witnesses.

LEWIS HALLOCK NASH.

Witnesses:
   E. F. PORTER,
   S. C. YEATON, Jr.